Jan. 14, 1969     F. E. DAHLEM     3,421,297

SEALING DEVICE FOR ROLL-TYPE FILTER

Filed Dec. 13, 1967

INVENTOR.
FRANCIS E. DAHLEM

BY

*Ralph B. Brick*

ATTORNEY

United States Patent Office 3,421,297
Patented Jan. 14, 1969

3,421,297
SEALING DEVICE FOR ROLL-TYPE FILTER
Francis E. Dahlem, Louisville, Ky., assignor to American Air Filter Company, Inc., Louisville, Ky., a corporation of Delaware
Filed Dec. 13, 1967, Ser. No. 690,147
U.S. Cl. 55—354
Int. Cl. B01d *33/04;* B01d *33/34*
2 Claims

ABSTRACT OF THE DISCLOSURE

A sealing device for a roll-type gas filter to prevent gas by-pass between a roll of filter medium and the housing in which it is disposed including a longitudinally extending flexible fabric member urged into yieldable contacting engagement against the peripheral surface of the roll of filter medium by a plurality of spaced resilient articulated back-up members.

Background of the invention

The present invention relates to gas separation devices and more particularly to a novel sealing arrangement for roll-type gas filter apparatus.

It is well known in the art of gas filtration to separate particulate materials from a dirty gas stream by a roll-type gas filter apparatus in which a supply roll of filter material is provided at one end of a filter housing, advanced in web or curtain form across a gas stream passage, and rewound on a rewind roll at the other end of the housing. It also is well known in the art to provide sealing arrangements cooperating with the filter medium rolls to prevent leakage of the dirty gas stream therearound.

For the most part, sealing arrangements which have been utilized in the past have been expensive in construction, operation, and maintenance, and have not always provided effective sealing—particularly when the surface of the filter medium roll has been irregular as is occasioned when large particles of contaminant materials are collected by the filter medium in the gas stream passage and subsequently incorporated in the rewind roll.

The present invention, recognizing that irregular roll surfaces have caused breaks between the sealing devices and the roll surfaces at the areas of irregularities so as to create gas leakage passages, provides a novel, straightforward and inexpensive sealing arrangement for filter medium rolls and roll-type gas filters which effects an efficient seal with the filter medium rolls, notwithstanding irregularities in the contour of the roll surfaces.

Various other features of the present invention will become obvious to one skilled in the art upon reading the disclosure set forth herein.

Summary of the invention

More particularly, the present invention provides a roll-type gas filter apparatus comprising a housing having a filter medium roll supply storage section, a filter medium roll rewind storage section, and a gas treating section intermediate the supply and rewind storage sections; a web of filter medium arranged to be fed in roll form from one storage section to the other through the gas treating section, and sealing means in at least one of the roll storage sections extending between the housing and the roll of filter medium therein to prevent gas bypassage therebetween, the sealing means including a longitudinally extending flexible sealing fabric sized to extend the length of the filter medium roll to engage in line contact against the peripheral surface of the roll, and a plurality of spaced, side-by-side resilient articulated back-up members arranged to engage against the flexible fabric along the length thereof to urge the fabric into yieldable sealing engagement with the filter medium roll.

It is to be understood that various changes can be made in the arrangement, form, and construction of the apparatus disclosed herein without departing from the scope or spirit of the present invention.

Referring to the drawing which discloses one advantageous embodiment of the present invention:

Figure 1:
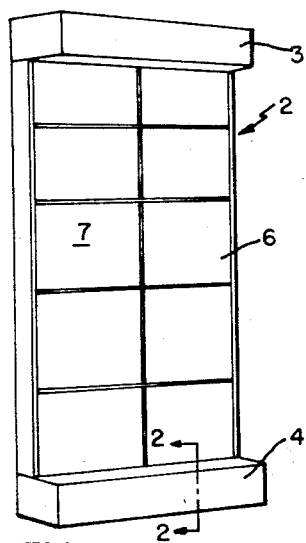
FIGURE 1 is an isometric view of a roll-type gas filter apparatus which can incorporate the novel features of the present invention.

As can be seen in FIGURE 1 of the drawing, a typical roll-type filter is disclosed including housing 2 having filter medium roll supply storage section 3, filter medium roll rewind storage section 4, and gas treating section 6 intermediate the supply and rewind sections 3, 4. A suitable web of filter material 7 is arranged to be fed in roll form from one section to the other through gas treating section 6.

Figure 2:
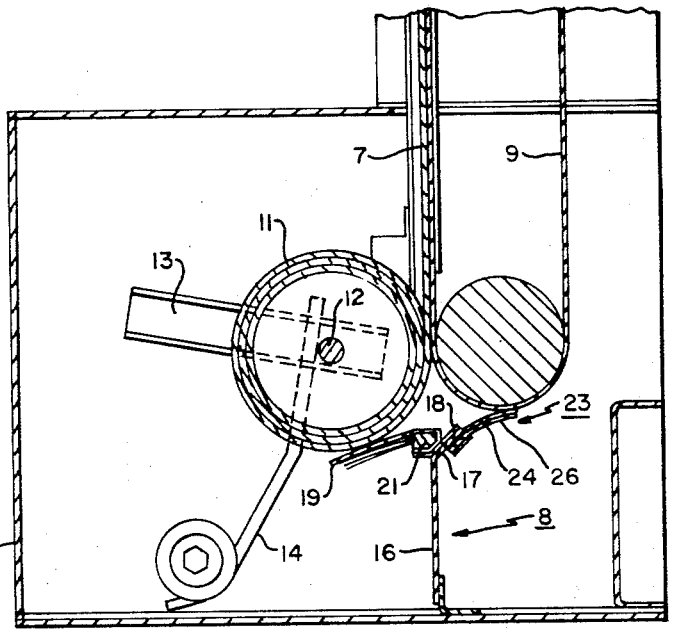
FIGURE 2 is an enlarged cross-sectional side elevational view of the lower portion of the apparatus of FIGURE 1 taken in a plane passing through line 2—2 of FIGURE 1 and disclosing the novel sealing arrangement of the present invention.
Figure 3:
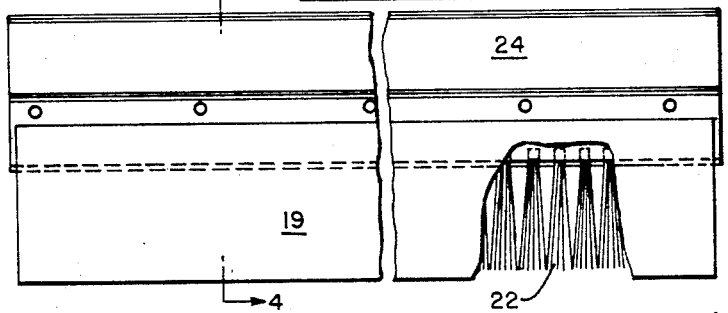
FIGURE 3 is a further enlarged broken away plan view of a portion of the sealing arrangement of FIGURE 2.
Figure 4:
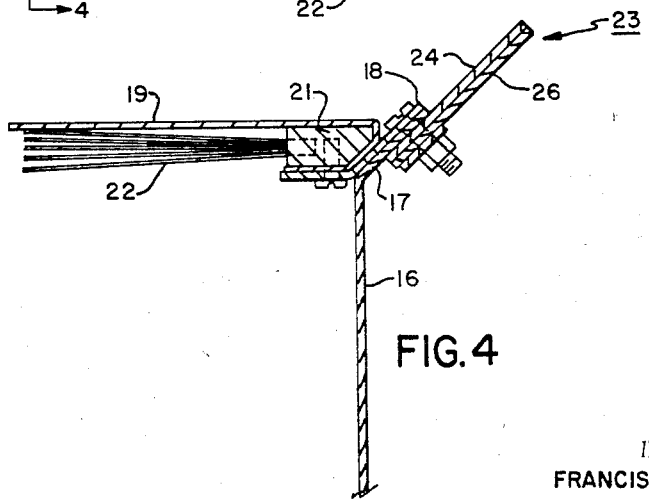
FIGURE 4 is a cross-sectional side elevational view taken in a plane through line 4—4 of FIGURE 3.

In accordance with the present invention and referring to FIGURE 2 of the drawing, a novel sealing arrangement designated broadly by reference numeral 8 is disclosed. Although the roll-type filter arrangement with the novel sealing assembly is incorporated is of a type which advances the filter medium by means of gas pervious endless belt conveyor assembly 9 (only a portion of which is dsiclosed), it is to be understood that the sealing arrangement of the present invention is not limited in its application to such particular type roll filter, but can be readily incorporated with other versions of roll-type filters known in the art.

In the apparatus disclosed, filter medium 7 is fed onto roll 11 in the rewind storage section, the roll being supported by spindles 12 at opposed ends (only one being disclosed), which in turn are mounted in inclined channels 13 is known in the art. As also is known in the art, suitable springs 14 serve to urge rewind roll 11 rearwardly against the endless belt conveyor assembly 9.

In accordance with the present invention, sealing arrangement 8 includes a rigid upright standard 16 extending from the bottom wall of the rewind section, the standard being provided with a turned lip portion 17. Mounted on the upper face of turned lip portion 17 is angle plate 18. Angle plate 18 serves to receive, in turn, one edge of a strip of soft, flexible, felt-like fabric material 19 sized to extend the length of filter medium roll 11 so as to engage in line contact against the peripheral surface of roll 11. The edge of the soft, felt-like fabric material 19 supported by angle plate 18 is held in position by longitudinally extending brush base member 21. Brush base member 21 is provided with a plurality of suitably spaced and aligned apertures extending along the length of the brush block to retain a row of synthetic resilient flexible fibers, such as nylon, grouped in clusters 22, one cluster being provided with each aperture, so that the clusters extend in cantilever brush fashion with the free ends of the clusters extending in side-by-side adjacent fashion to resiliently urge fabric 19 against filter medium roll 11. Accordingly, when the peripheral surface of filter medium roll 11 assumes an irregular contour, the resilient clusters will yield to conform the filter fabric to the contour of the roll and thus avoid gas by-passage which would otherwise occur.

It is to be noted that in addition to sealing assembly 8 for filter medium roll 11, a secondary sealing arrangement 23 can be provided to extend from the lower face of lip 17 of upright standard 16. This second assembly includes a felt strip 24 and a suitable flexible backing strip 26 which advantageously can be of neoprene material.

The invention claimed is:

1. A roll-type gas filter apparatus comprising: a housing having a filter medium roll supply storage section, a filter medium roll rewind storage section, and a gas treating section intermediate said supply and rewind storage sections; a web of filter medium arranged to be fed in roll form from one storage section to the other through said gas treating section; and sealing means in at least one of said roll storage sections extending between said housing and the roll of filter medium therein and preventing gas by-passage therebetween, said sealing means including a longitudinally extending flexible sealing fabric extending the length of the filter medium roll and engaging in line contact against the peripheral surface of said roll and a plurality of spaced side-by-side resilient articulated back-up members extending along the length of said fabric urging said fabric into yieldable sealing engagement with said filter medium roll.

2. The apparatus of claim 1, said back-up member comprising a longitudinally extending base member and a row of synthetic resilient fibers supported in spaced clusters in cantilever brush fashion from said base member, with the free ends of the clusters extending in side-by-side fashion to resiliently urge said fabric against said filter medium roll.

References Cited

UNITED STATES PATENTS

| | | | |
|---|---|---|---|
| 2,125,574 | 8/1938 | Knight et al. | 55—290 |
| 2,473,501 | 6/1949 | Bahnson | 55—290 X |
| 2,732,912 | 1/1956 | Young | 55—290 |
| 2,867,324 | 1/1959 | Hirs | 210—387 X |
| 2,881,859 | 4/1959 | Nutting | 55—352 |
| 3,071,060 | 1/1963 | Forshee | 98—115 |
| 3,201,272 | 8/1965 | Forshee | 117—102 |
| 3,342,123 | 9/1967 | Ermakov et al. | 100—115 |
| 3,348,366 | 10/1967 | Bennett | 55—354 |

FOREIGN PATENTS 746,162   3/1956   Great Britain.

FRANK W. LUTTER, *Primary Examiner.*

DENNIS E. TALBERT, JR., *Assistant Examiner.*

U.S. Cl. X.R.

55—502; 210—387, 400